United States Patent [19]
Schott, Jr. et al.

[11] 3,884,375
[45] May 20, 1975

[54] BAG OPENING AND EMPTYING WITH TRAVELING CONVEYOR

[75] Inventors: Charles Mandeville Schott, Jr.; Charles Mandeville Schott, Sr., both of Califon, N.J.

[73] Assignee: Charles M. Schott, Jr.

[22] Filed: July 16, 1973

[21] Appl. No.: 379,484

[52] U.S. Cl............... 214/305; 100/98 R; 198/139
[51] Int. Cl............................................ B65g 65/04
[58] Field of Search.......... 214/305, 16.6; 100/98 R; 198/139, 40; 30/2; 83/857

[56] References Cited
UNITED STATES PATENTS

| | | | |
|---|---|---|---|
| 1,477,106 | 12/1923 | Caldwell | 83/857 |
| 2,094,818 | 10/1937 | Rich et al. | 214/305 |
| 2,796,184 | 6/1957 | Wilkins et al. | 214/305 |
| 3,238,826 | 3/1966 | Crispe | 198/139 |
| 3,242,342 | 3/1966 | Gabar | 198/40 |
| 3,289,815 | 12/1966 | Richter et al. | 198/139 |
| 3,372,217 | 3/1968 | Paerels et al. | 214/16.6 |
| 3,467,267 | 9/1969 | Elten | 214/305 |
| 3,625,377 | 12/1971 | Bonannon et al. | 214/8.5 A |

FOREIGN PATENTS OR APPLICATIONS

| | | | |
|---|---|---|---|
| 2,012,814 | 9/1971 | Germany | 214/305 |

*Primary Examiner*—Robert J. Spar
*Assistant Examiner*—Lawrence J. Oresky

[57] ABSTRACT

Bag opening and emptying machine having a conveyor feed system in which a conveyor guide moves bodily into the station, the conveyor operates to bring a bag into the station, and the conveyor guide moves out while depositing the bag at the station. Featured are a constant loop conveyor belt means accomplishing the above by means of equally and oppositely acting take-up, pay-out devices, and during removal action of the guide, the conveyor loop itself is held stationary. The conveyor is shown depositing the bag on a fixed knife array, against which the bag is pressed by a platen, which then raises the emptied bag and deposits it on the returned conveyor. A countdown system ensures that the bag is centered on the knife assembly.

4 Claims, 21 Drawing Figures

PATENTED MAY 20 1975

PATENTED MAY 20 1975

BAG OPENING AND EMPTYING WITH TRAVELING CONVEYOR

This invention relates to the opening and emptying of bags containing particulate substances, including substances which are tightly compacted or contain interlocking fibers or are otherwise difficult to remove from the bags.

Principal objects of the invention are to provide such machines which are simple and reliable, enable complete and automated removal of the substance and accommodate variation in the condition of the bags and in the substance.

According to one aspect of the invention a conveyor belt means is provided for delivering a bag to be cut and emptied at a station. It includes a conveyor belt guide means movable bodily and carrying conveyor belt from a first position spaced from the station to a second position overlying the station, the conveyor belt in the latter position being movable about the thus positioned guide means to convey a bag to the station and the machine being operable to return the guide means toward the first position while progressively depositing the bag at the station.

According to another aspect of the invention the guide means just mentioned is one of a pair of equally but oppositely acting take-up and pay-out means mounted on a shuttle frame and operable within a constant length conveyor belt loop which is trained over these guide means and about stationary axes guides. When depositing the bag at the station the conveyor belt loop is held stationary and movement of the shuttle frame is effective to peel the stationary conveyor belt from beneath the stationary bag, thus depositing the bag at the station.

Preferred embodiments feature a stationary blade assembly upon which the conveyor system deposits the bag and also a count-down system for ensuring that the conveying action of the belt stops and deposit of the bag starts with the bag centered upon the knife blade assembly.

Preferably the bag emptying machine comprises a horizontally arranged blade array disposed to receive thereupon a bag from the shuttle frame, a platen above this blade array and a reciprocal platen drive constructed to press the platen facewise upon the upper surface of the bag and thereby urge the bag and contents downwardly against and past the blade to cut the lower surface of the bag and its contents into a number of portions, the contents falling to a receiver below the blade. Preferred embodiments of this aspect of the invention include the conveyor operable in the region between the blade and platen for delivering the bag facewise upon the blades and a bag removing means mounted on the platen and movable therewith so that movement of the platen in the retracting direction is effective to raise the bag removing means and thereby remove the bag from the blade. Preferably the conveyor is then interposed between the platen and the bag, the bag removing means releasing the empty bag thereupon.

These and other objects and features of the invention will be understood from the description of a preferred embodiment taken in conjunction with the drawings wherein:

FIG. 9a is a diagrammatic side view and FIG. 9b a similar end view of a bag which has been cut using the knife array of FIG. 1;

Figure 1:
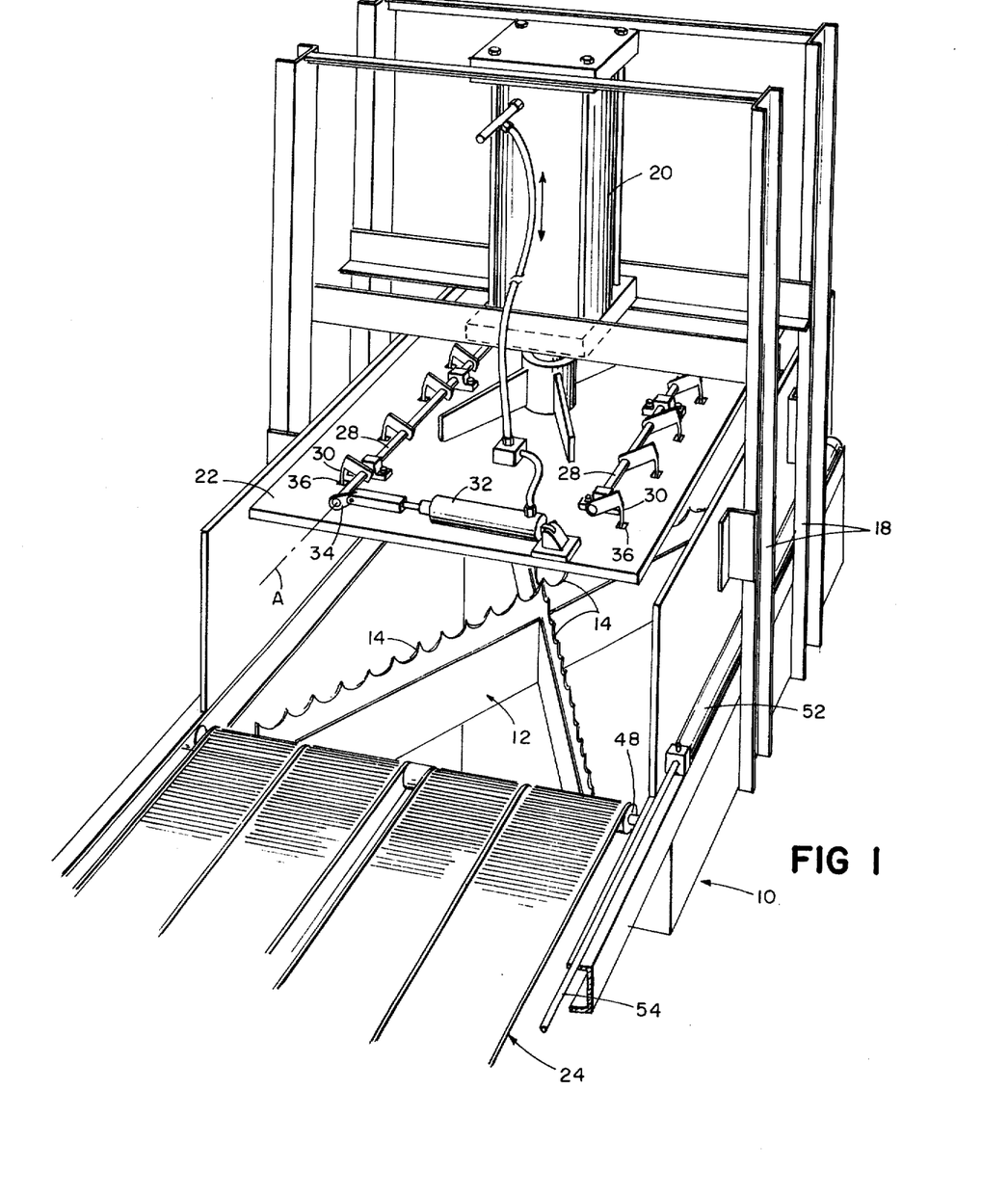
FIG. 1 is a perspective view of a preferred embodiment of the apparatus of the invention.
Figure 1A:
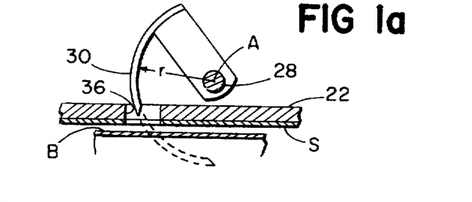
FIG. 1a is a highly magnified side view of a portion of the platen and the empty bag-gripping device of FIG. 1.
Figure 2:
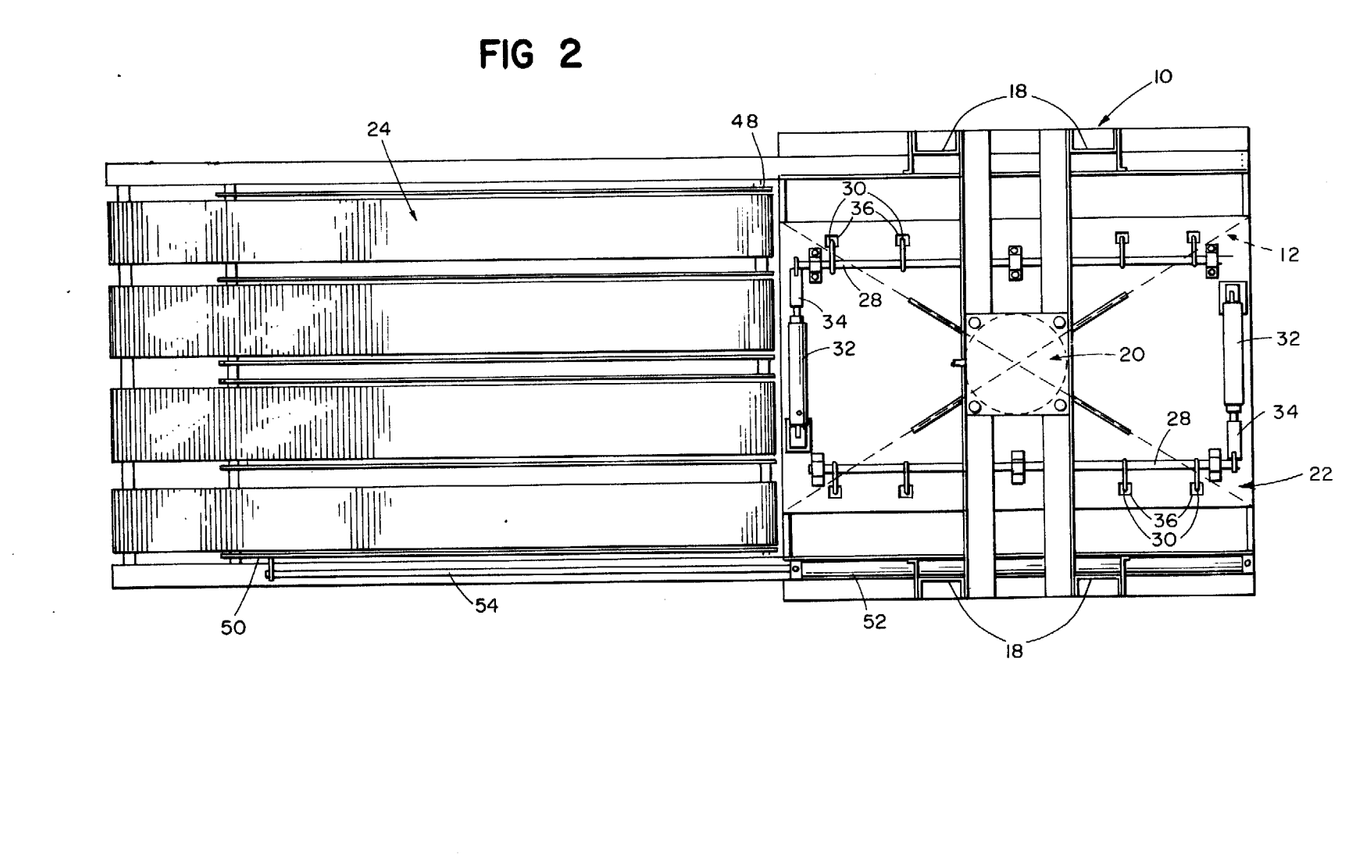
FIGS. 2, 3 and 4 are respectively plan, elevation, and end views of the apparatus of FIG. 1.
Figure 8:
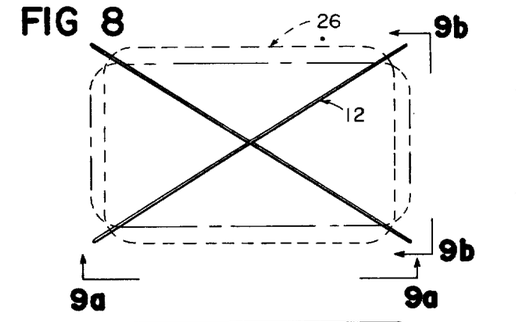
FIG. 8 is a diagrammatic plan view illustrating the relation of the knife array of FIG. 1 with a bag profile.

Referring to the preferred embodiment of FIGS. 1–4, the bag emptying device comprises a stationary frame 10, a pair of stationary elongated cutting blades 12 having upwardly-directed serrated cutting edges 14, the blades arranged in an X pattern, see FIG. 8, with an included angle of 66° in the direction of elongation of the blade array. The blades lie over hopper guides 16 which direct the substance from the bags to the point of utilization. Stationary vertical frame members 18 extend upwardly from frame 10 and mount a hydraulic ram 20, the piston of which supports platen 22. The cutting edges 14 of the blades lie in a horizontal plane and the platen 22 comprises an opposed horizontal plate member. The platen moves in the direction of the arrows downwardly toward the blades in the cutting direction and retracts upwardly. A conveyor system 24, described below in more detail, is arranged to deliver a bag upon the blades. Referring to FIG. 8 the profile shown in dashed lines represents various bags for which this particular embodiment is adapted to operate. The blades 12 have end portions which extend beyond the bag profile in the corner regions, corner regions here generally referring to the section of the bag at the intersection of the end edges $E_E$ and the side edges $E_S$ of the various bags, and extending from the intersection approximately two or three inches. Upon the platen 22 are journaled two shafts 28 extending in the longitudinal direction of the machine, each carrying a plurality of curved needle-like spears 30 (see FIG. 1a) having center of curvature on axis A of shafts 28, radius of curvature r greater than the distance between axis A and the lower surface S of the platen and positioned to rotate through slots 36 in the plate. Air actuators 32 mounted on the platen rotate shafts 28 by bell cranks 34 to cause spears 30 to rotate through the slots or return as required by the sequence of operation.

The conveyor 24 includes a conveyor belt guide movable bodily, carrying a conveyor belt loop from a first position spaced from the opening and emptying station to a second position overlying the station, the conveyor belt in the latter position being movable about the guide to convey a bag to the station, and the belt guide member thereupon being operable to return toward the first position while the belt is otherwise stationary, thus progressively depositing the bag upon the knife blade.

Figures 3, 6:
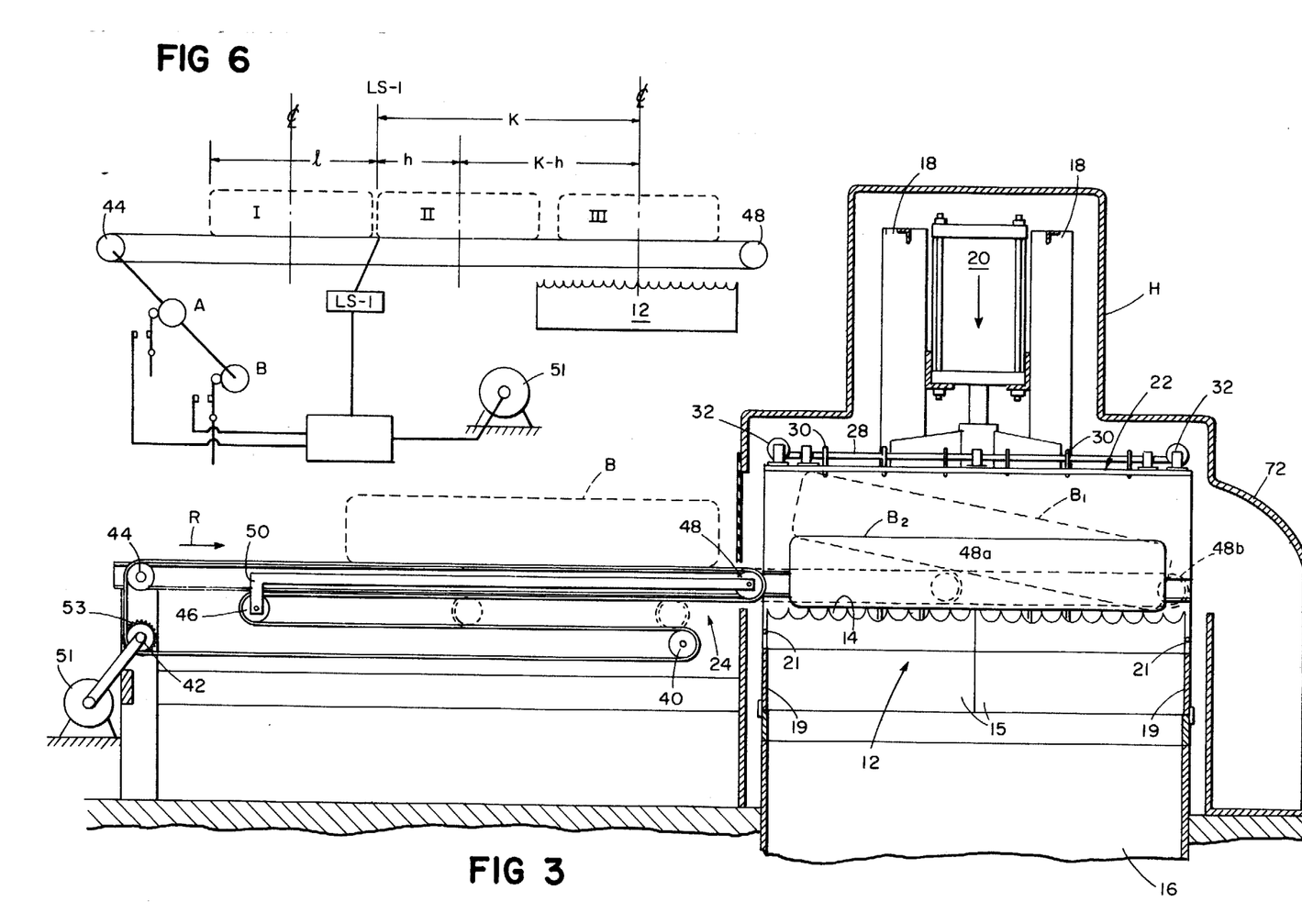
FIG. 6 is a diagrammatic view illustrating means for positioning a bag for opening by the apparatus of FIG. 1.
Figure 4:
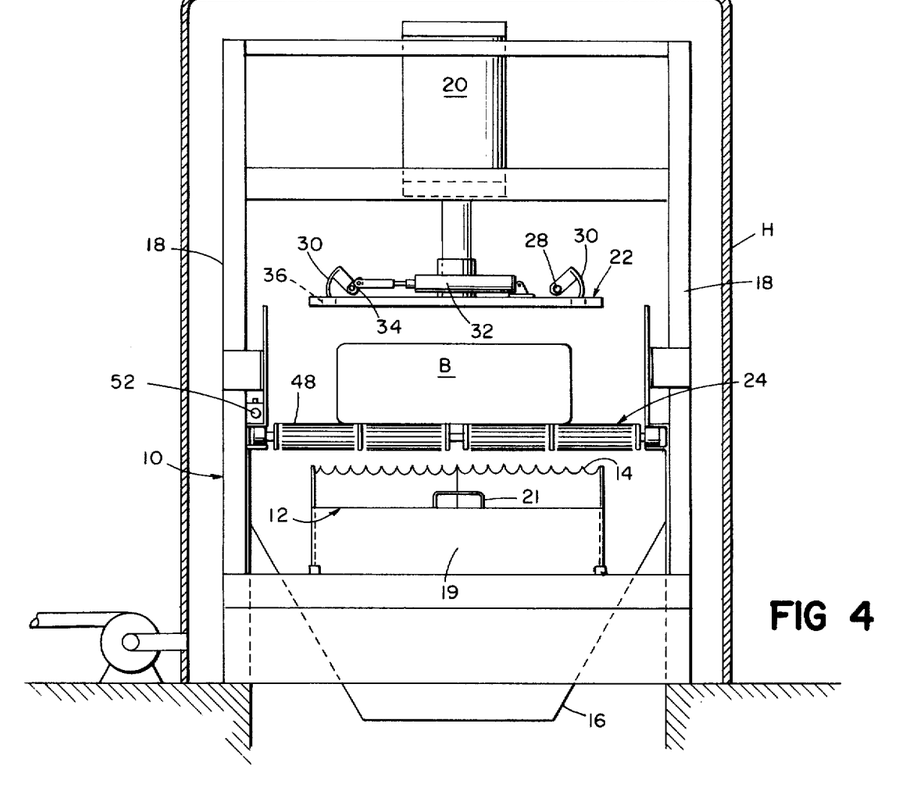

Referring in particular to FIG. 3, a constant length loop of conveyor belt courses over stationary axis guide rolls 40, 42 and 44, and over two guide rolls 46 and 48 mounted on shuttle frame member 50. The respective runs of conveyor between guide roll pairs 40-42, 44-48, 48-46 and 46-40 are horizontal and the shuttle is mounted on guides for similar horizontal movement, being controllably driven by linear hydraulic cylinder 52 and piston rod 54. Thus rolls 46 and 48 comprise oppositely acting take-up and pay-out devices. When the shuttle is in its leftward position as shown in solid lines in FIG. 3, roll 46 maintains a large interior loop of conveyor belt lying between the upper and lower conveyor belt runs. In this position roll 48 is retracted relative to the opening station and the way is clear for platen 22 to operate and press a bag downward against the knife blades. Subsequent to this pressing action and upward retraction of the platen, the shuttle frame 50 moves rightward, roll 48 serving to extend the loop of conveyor belt trained about it while roll 46 simultaneously pays out conveyor belt in equal amount. Roll 48 moves progressively through position 48a (FIG. 3) to position 48b to the far side of the station. In this position conveyor belt drive motor 51 is energized and through sprocket 53 drives the conveyor belt in the direction of arrow R. A bag B now deposited on the conveyor belt is carried therewith to the opening station, at which point motor 51 is stopped and sprocket 53 braked to prevent motion of the conveyor belt. Thereupon shuttle drive cylinder 52 is energized to retract the shuttle. As roll 48 progressively moves from position 48b to position 48a, the stationary conveyor belt is effectively peeled from beneath the stationary bag, and the bag is progressively deposited upon the knife blade array. The dotted line position $B_1$ denotes the position of the bag when roll 48 is in position 48a. With further retraction movement of roll 48 toward the leftmost position, the bag comes to rest upon the knife blade array as denoted by position $B_2$. At this point the machine and bag are in position to initiate a cycle of operation.

Figure 5A:
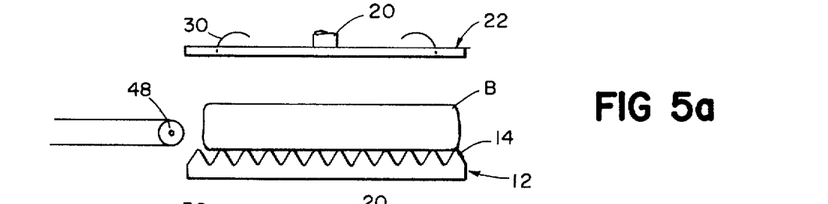
FIGS. 5a–5h are a sequence of diagrammatic side views showing the relation of the various elements of the apparatus of FIG. 1 at various stages of a cycle of its operation.

Referring to FIG. 5a, the bag B lies upon the cutting edges 14 of knife blade array 12 and platen 22 and conveyor belt guide roll 48 are in their retracted positions. Thereupon, FIG. 5b, platen 22 is lowered, urging the bag and contents against and past the blade array, the blade forming (see FIGS. 8-10) the corner cuts $C_L$ in the L formations of the bag (the region of intersection of the end edges $E_E$ and the side edges $E_S$), corner cuts $C_F$ in the corresponding regions of the lower braod face of the bag, and middle cuts $C_M$ across the lower broad face of the bag, with corresponding cuts in the contents itself. As suggested in FIGS. 9a and 9b, the contents-retaining corner regions are thus severed, and the bottom and edge portions of the bag are cut into four separate, down-hanging sections. The contents also cut into non self-supporting portions fall freely between the blades. The platen 22 closely approaches but does not contact the knife blades and the upper broad surface of the bag remains intact supporting down-hanging portions of the bag just mentioned.

Figures 5B, 5C:
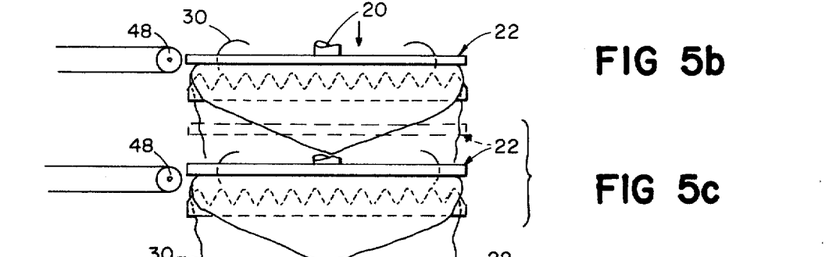

Referring still to FIG. 5b, as the platen travels downwardly under the force provided by ram 20, the actuators 32 carried on the platen are activated, rotating shafts 28 and spears 30, causing them to describe a circular arc emerging through slots 36 and pentrating and spearing the substance of the bag.

After the contents have fallen from the severed bag platen 22 rises from the solid to the dotted line positions of FIG. 5c, pulling with it the empty bag.

Figure 5D:
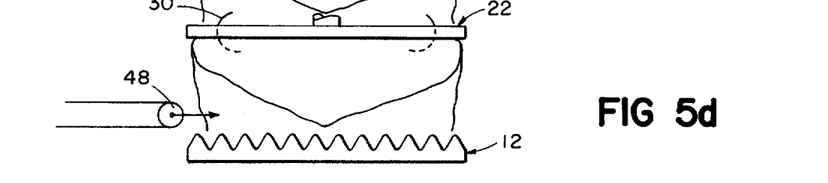
Figure 5E:
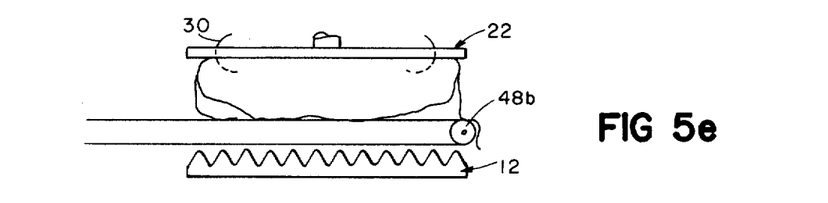
Figure 5F:
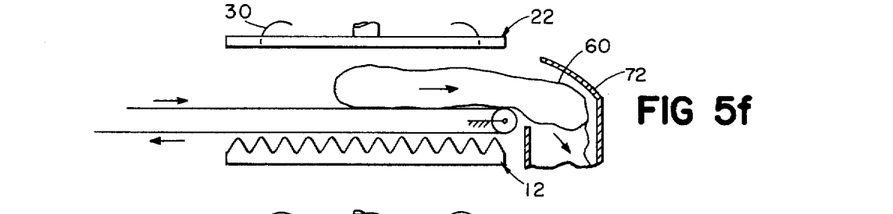
Figure 5G:
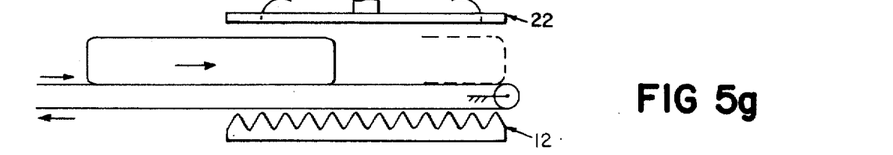
Figure 5H:
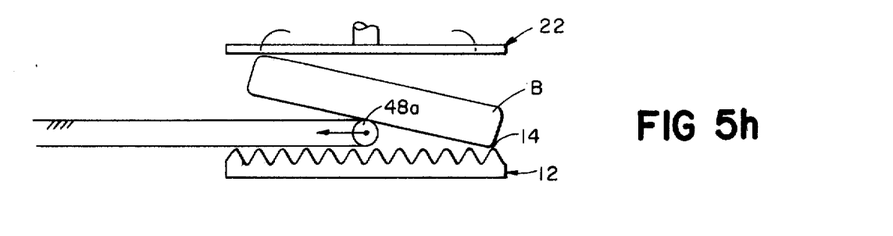

Thereupon, FIG. 5d, shuttle roll 48 is moved rightward by actuator 52, passing below the platen 22 and the empty bag thereon. When roll 48 reaches its fully extended position, 48b, actuators 32 are actuated in reverse, withdrawing the circular spears from the bag and allowing the empty bag to fall upon the conveyor. Conveyor drive motor 51 is reactivated, the conveyor belt moves in the direction of the arrows, FIG. 5f, and the empty bag is conveyed into receiver 60. Simultaneously a new bag to be emptied is conveyed into the station, FIG. 5g, the conveyor belt is stopped, the conveyor roll 48 is withdrawn in the direction of the arrow, FIG. 5h, the bag is deposited upon the knife array and the machine is ready for a new cycle of operation.

For ensuring the proper longitudinal position of the delivered bag to the blade array, a control is employed to stop the conveyor at the moment when the center of the bag reaches the center line of the blade array. This control includes leading and trailing edge detection means to detect the respective portions of the bag as it proceeds along the detector toward the work station, means dependent upon the advancing rate of the conveyor for generating effectively a count h proportioned to half the advance of the conveyor between detection of the leading and trailing portions of the bag, means also based upon the advancing rate of the conveyor, to generate a count equal to $(k-h)$ where $k$ is a constant corresponding to the distance between the detector and the center line of the blade array, and means for stopping the conveyor upon the completion of the latter count.

Figure 7:
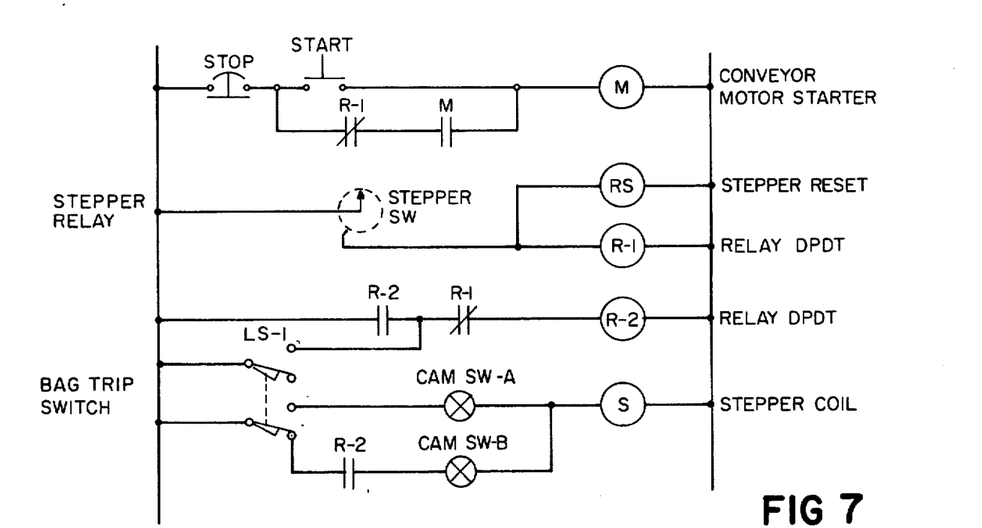
FIG. 7 is a circuit diagram for operation in accordance with FIG. 6.

For implementation, referring to FIGS. 6 and 7, two cams A and B are fixed to the shaft corresponding with idler 44, turning dependently therewith and with the conveyor belt. Cam A has lobes to trip switch A (SWA) for every 2 inches of conveyor travel and cam B has lobes to trip switch (SWB) for every 1 inch of conveyor travel.

The bag detector LS-1 is positioned along the path of the bag on the conveyor, and is depressed so long as the bag registers with it. When LS-1 is depressed as by a bag reaching position I in FIG. 6, it enables pulses from cam and switch A to be applied to stepper relay SR, each pulse advancing the stepper relay by one position. As the bag reaches position II and releases the detector LS-1, pulses from cam and switch B are instead applied to the stepper relay, each pulse advancing the relay by one position beyond the position attained during operation of cam and switch A until the preset K position of the relay is reached, at which time the relay de-energizes motor 51 and resets itself to zero position. The total count h applied by cam and switch A corresponds to half the bag length in inches, and represents the amount by which the center of the bag has advanced beyond the detector LS-1 by the time the bag fully passes the detector. The total of the count $(K-h)$ applied by cam and switch B represents the distance in inches from that advanced position of the center of the bag to the center line of the blade array. Normally the preset count K in the stepper relay and the corresponding distance K between the detector LS-1 and the center line of the blade array is chosen greater than half the length of the longest bag to be handled, thus ensuring that all bags to be handled are properly centered at the time of operation of platen 22.

In construction of the preferred embodiment the entire bag opening and emptying assembly is surrounded by a dust-containing housing H connected to a blower to maintain a reduced pressure therein and prevent escape of dust from the entry and exit openings. The entry opening for the conveyor and bag is shrouded e.g. by multiple rubber strips 70 effectively blocking the entry while flexing out of the way to permit entry of the conveyor shuttle roll 48 and the bag.

As shown, the empty bags are discharged through a chute to a receiver which may be a portable disposal box or a baler.

The contents discharge downwardly from the knife array to a hopper or a dustproof take-away conveyor.

The in-feed conveyor is constructed of multiple chains formed of steel rods in a ladder-like construction, e.g. four chains each of 7 inches width.

Figures 9A, 9B, 11:
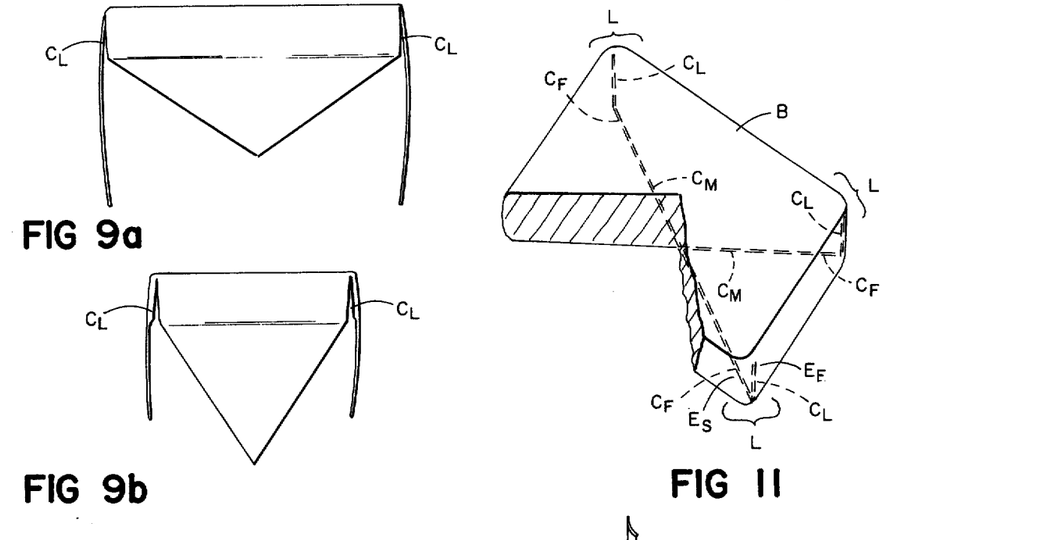
Figure 10:
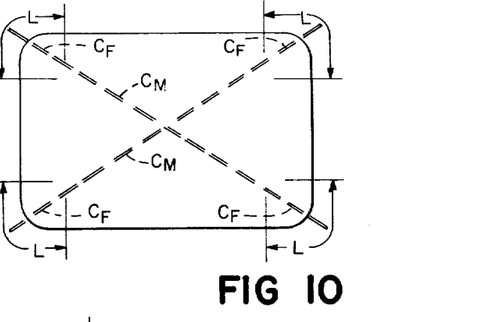
FIG. 10 is a diagrammatic plan view and FIG. 11 a diagrammatic perspective view partially broken away of bag contents which have been cut using the knife array of FIG. 1.
Figure 12:
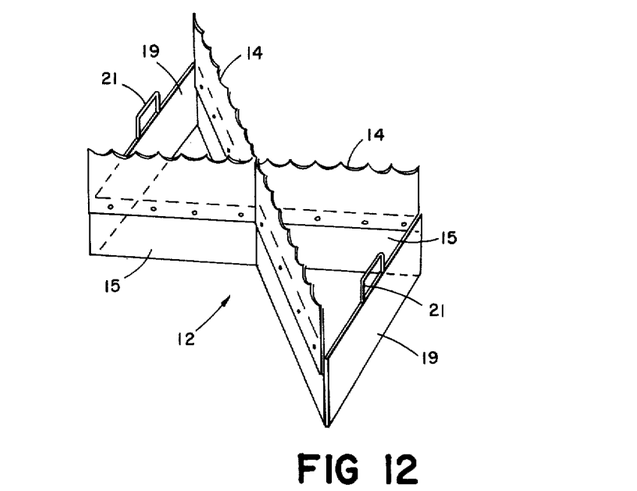
FIG. 12 is a perspective view of a knife blade holder employed in the embodiment of FIG. 1.

Referring to FIG. 11 the blades 12 are held in a rigid X array bladeholder assembly 13 comprising X members 15 to which the blades are removably bolted and rigid cross-headers 19 securing the X members together as a rigid unit. Handles 21 are provided to facilitate removal. This assembly is positioned upon rigid supports in the operative position, but is slideable to either side for the purpose of servicing the blades. In the preferred embodiment the rectangular envelope occupied by the X blades is 44 inches long and 30 inches wide, suitable e.g. for all bags up to 40 inches long and 24 inches wide. In general it will accept most conventional bags, with length to width ratio between 2 to 1 and 1½ to 1.

The ram 20 has a capacity of 4 tons, 2 tons being all that is required for numerous types of bags and contents, higher forces being employed in other instances as with asbestos fibers. Normally the platen 22 approaches the knife blade cutting edge 14 within 1 inch.

Actuator cylinders 32 are provided with pressure limiting means, i.e. a relief valve or regulated air pressure, that limits the force with which the spears 30 are pressed against the bag. Activation of the actuators 32 is controlled by a pressure sensor which senses a predetermined pressure in the motive fluid of the ram 20. By this means it is assured that the spears do not operate prematurely, but only when the platen has already engaged the bag; equally it ensures that the spears operate while contents remain in the bag, thus assuring that the bag is sufficiently firm to enable spearing. Upon actuation, the spears will penetrate as far as allowed by the resistance encountered, and as the pressure of the contents decreases, spearing proceeds to ensure a firm grip upon the bag.

Numerous variations from the various parts shown for the preferred embodiment are possible within the spirit and scope of the claims.

What is claimed is:

1. In a bag emptying machine comprising a fixed blade array disposed to engage a broad face of a bag, a presser having a bag-engaging surface generally opposed to the cutting edges of said blade array, a reciprocal presser drive constructed to press said presser facewise upon an opposite broad face of said bag and thereby urge the bag and contents against said blade array to cut the first mentioned face of the bag to release its contents and to retract, a receiver for receiving the contents of the bag and means operable to carry a bag between said blade array and presser and deliver said bag facewise to said blade array the improvement wherein said conveyor means comprises a conveyor belt and a conveyor belt guide member movable bodily carrying said conveyor belt from a first position spaced from said blade array to a second position overlying said blade array, said conveyor belt in the latter position being movable about said guide to convey a bag to said blade array, said conveyor belt guide thereupon being operable to return toward said first position while progressively depositing said bag facewise directly upon the cutting edges of said blade array in position to be cut, and said bag emptying machine including means to lift an empty bag from the cutting edges of said blade array while said guide is in said first position and to deposit said empty bag upon said conveyor belt when said guide is in said second position, said conveyor belt thereupon being operable to convey away said empty bag.

2. The bag emptying machine of claim 1 wherein motion of said conveyor belt over said guide in the direction to deliver a bag to said station is effective to convey away therefrom an empty bag.

3. In a bag emptying machine comprising a fixed blade array disposed to engage a broad face of a bag, a presser having a bag-engaging surface generally opposed to the cutting edges of said blade array, a reciprocal presser drive constructed to press said presser facewise upon an opposite broad face of said bag and thereby urge the bag and contents against said blade array to cut the first mentioned face of the bag to release its contents and to retract, a receiver for receiving the contents of the bag and a conveyor means operable to carry a bag between said blade array and presser and deliver said bag facewise to said blade array, the improvement wherein said conveyor means comprises a conveyor belt and a conveyor belt guide member movable bodily carrying said conveyor belt from a first position spaced from said blade array to a second position overlying said blade array, said conveyor belt in the latter position being movable about said guide to convey a bag to said blade array, said conveyor belt guide thereupon being operable to return toward said first position while progressively depositing said bag facewise directly upon the cutting edges of said blade array in position to be cut.

4. A bag emptying machine comprising a bag cutting and emptying station and a conveyor belt means for delivering a bag to be emptied to said station, said conveyor belt means having a conveyor belt guide member movable bodily, and carrying said conveyor belt from a first position spaced from said station to a second position overlying said station, said conveyor belt in the latter position being movable about said guide to convey a bag to said station, said conveyor belt means thereupon being operable to return said guide toward said first position while progressively depositing said bag at said station, said conveyor belt means including an endless conveyor belt loop, guide rolls mounted on stationary axes, and equally and oppositely acting take-up and pay-out guide roll means mounted on axes supported on a movable shuttle frame within the loop of said conveyor belt, said shuttle frame being movable relative to said stationary axes from a retracted position spaced from said station to a position overlying said station without altering the length of said loop, said conveyor belt means adapted to hold the overall loop stationary while moving said shuttle frame from its second position over said station toward said first position thereby to deposit said bag at said station, said bag emptying machine including a cutter assembly requiring centering of the bag for effective action, said conveyor adapted to deliver said bag to said cutter assembly and means for stopping the advancing motion with the bag in centered position, said means including leading and trailing edge detection means adapted to detect the bag as it proceeds along the conveyor past said detection means toward said cutter assembly, and based upon the advancing rate of said conveyor generating effectively a count $h$ proportional to half the advance of said conveyor between detection of the leading and trailing edges of said bag, and means based upon the advancing rate of said conveyor for generating thereafter a further count $(k-h)$ where $k$ corresponds to the distance between said detection means and said cutter assembly and means responsive to said count to de-energize said conveyor thereby to position said bag centered at said cutter assembly.

* * * * *